United States Patent
Jang et al.

(10) Patent No.: US 8,976,699 B2
(45) Date of Patent: Mar. 10, 2015

(54) SECONDARY CARRIER ACTIVATION/DEACTIVATION METHOD AND APPARATUS FOR MOBILE COMMUNICATION SYSTEM SUPPORTING CARRIER AGGREGATION

(71) Applicant: Samsung Electronics Co., Ltd., Suwon-si (KR)

(72) Inventors: Jae Hyuk Jang, Suwon-si (KR); Soeng Hun Kim, Yongin-si (KR); Boon Loong Ng, Richardson, TX (US); Gert-Jan Van Lieshout, Staines (GB); Kyeong In Jeong, Suwon-si (KR); Joon Young Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/243,453

(22) Filed: Apr. 2, 2014

(65) Prior Publication Data

US 2014/0211744 A1 Jul. 31, 2014

Related U.S. Application Data

(63) Continuation of application No. 13/347,961, filed on Jan. 11, 2012, now Pat. No. 8,792,376.

(60) Provisional application No. 61/431,635, filed on Jan. 11, 2011.

(30) Foreign Application Priority Data

Dec. 26, 2011 (KR) .................. 10-2011-0141875

(51) Int. Cl.
*H04L 1/00* (2006.01)
*H04L 12/26* (2006.01)
*H04L 12/28* (2006.01)
*H04W 4/00* (2009.01)

(52) U.S. Cl.
USPC .......................... 370/252; 370/254; 370/329

(58) Field of Classification Search
CPC ......... H04L 47/10; H04L 43/50; H04L 41/12; H04L 45/02; H04W 28/04; H04W 72/04
USPC ........................................ 370/252, 254, 329
See application file for complete search history.

(56) References Cited

U.S. PATENT DOCUMENTS

| | | | |
|---|---|---|---|
| 2008/0287068 A1 | 11/2008 | Etemad | |
| 2010/0316026 A1* | 12/2010 | Lee et al. | 370/336 |
| 2011/0116467 A1 | 5/2011 | Jung et al. | |
| 2012/0213129 A1 | 8/2012 | Jang et al. | |

FOREIGN PATENT DOCUMENTS

| | | |
|---|---|---|
| KR | 2010-0009493 A | 1/2010 |
| WO | 2010-051514 A1 | 5/2010 |

* cited by examiner

*Primary Examiner* — Ronald Abelson
(74) *Attorney, Agent, or Firm* — Jefferson IP Law, LLP

(57) ABSTRACT

A method for activating/deactivating secondary carriers of a User Equipment (UE) in a mobile communication system supporting carrier aggregation is provided. The method comprises, receiving a control message including an activation/deactivation Control Element (CE) in a first sub-frame from a Base station, identifying an activation command or a deactivation command of at least one secondary carrier based on the control message, determining whether a current sub-frame is a second sub-frame or not, performing at least one first operation for the at least one secondary carrier in a second sub-frame, and performing, when the activation/deactivation CE indicates deactivation of the at least one secondary carrier, at least one second operation for the at least one secondary carrier no later than the second sub-frame.

15 Claims, 7 Drawing Sheets

US 8,976,699 B2

SECONDARY CARRIER ACTIVATION/DEACTIVATION METHOD AND APPARATUS FOR MOBILE COMMUNICATION SYSTEM SUPPORTING CARRIER AGGREGATION

CROSS-REFERENCE TO RELATED APPLICATIONS

This application is a continuation application of a prior application Ser. No. 13/347,961, filed on Jan. 11, 2012, which claimed the benefit under 35 U.S.C. §119(e) of U.S. Provisional application filed on Jan. 11, 2011 in the U.S. Patent and Trademark Office and assigned Ser. No. 61/431,635, and under 35 U.S.C. §119(a) of a Korean patent application filed on Dec. 26, 2011 in the Korean Intellectual Property Office and assigned Serial number 10-2011-0141875, the entire disclosure of each of which is hereby incorporated by reference.

BACKGROUND OF THE INVENTION

1. Field of the Invention

The present invention relates to a mobile communication system. More particularly, the present invention relates to a method for activating/deactivating secondary carrier(s) in addition to a primary carrier for the mobile communication system supporting carrier aggregation.

2. Description of the Related Art

With the rapid development of wireless communication technologies, Long Term Evolution (LTE) is taking a strong position in $4^{th}$ Generation (4G) mobile communication technology. Various techniques have been introduced to meet the high capacity requirements of LTE. Carrier aggregation is a technique to increase the peak data rate and capacity, as compared to single carrier transmission, by aggregating one or more secondary carriers with a primary carrier between User Equipment (UE) and an evolved Node B (eNB). In LTE, the primary carrier is referred to as Primary Cell (PCell) and the secondary carrier as Secondary Cell (SCell).

The carrier aggregation technique causes additional control complexity for the PCell to control the SCells. This means that the PCell should be able to determine whether to use SCell and, if so, determine the SCell to be used. There is also a need for a method of activating and deactivating SCells. This means that the actual operations of the UE in receipt of SCell activation/deactivation command from the eNB should be specified in detail.

SUMMARY OF THE INVENTION

Aspects of the present invention are to address at least the above-mentioned problems and/or disadvantages and to provide at least the advantages described below. Accordingly, an aspect of the present invention is to provide a method for activating and deactivating SCell in the mobile communication system supporting carrier aggregation.

Another aspect of the present invention is to provide a method for activating and deactivating SCell in a mobile communication system that is capable of initiating some operations with delay in activation of a SCell, terminating some operations in advance in deactivation of the SCell, and terminating some operations at a predetermined time.

In another aspect of the present invention, a method for activating/deactivating secondary carriers of a User Equipment (UE) in a mobile communication system supporting carrier aggregation is provided. The method comprises receiving a control message including an activation/deactivation Control Element (CE) in a first sub-frame from a Base station, identifying an activation command or a deactivation command of at least one secondary carrier based on the control message, determining whether a current sub-frame is a second sub-frame or not, performing at least one first operation for the at least one secondary carrier in a second sub-frame, and performing, when the activation/deactivation CE indicates deactivation of the at least one secondary carrier, at least one second operation for the at least one secondary carrier no later than the second sub-frame In yet another aspect of the present invention, a User Equipment (UE) for controlling activation/deactivation of secondary carriers in a mobile communication system supporting carrier aggregation is provided. The UE comprises a transceiver configured to communicate signals with a base station, and a controller configured to receive a control message including an activation/deactivation Control Element (CE) in a first sub-frame from a Base station, to identify an activation command or a deactivation command of at least one secondary carrier based on the control message, to determine whether a current sub-frame is a second sub-frame or not, to perform at least one first operation for the at least one secondary carrier in a second sub-frame, and to perform, when the activation/deactivation CE indicates deactivation of the at least one secondary carrier, at least one a second operation for the at least one secondary carrier no later than the second sub-frame.

In still another aspect of the present invention, a method for activating/deactivating secondary carriers in a base station in a mobile communication system supporting carrier aggregation is provided. The method comprises configuring a control message including an activation/deactivation Control Element (CE), the activation/deactivation CE corresponding to activation/deactivation of at least one secondary carrier, transmitting to the UE the secondary carrier control message in a first subframe, receiving, when the activation/deactivation CE indicates activation of the at least one secondary carrier, a Channel State Information (CSI) report on the at least one carrier in a second subframe, and receiving, when the activation/deactivation CE indicates deactivation of the at least one secondary carrier, a CSI report for the at least one secondary carrier no later than the second subframe.

In still another aspect of the present invention, a base station for controlling activation/deactivation of secondary carriers in a mobile communication system supporting carrier aggregation is provided. The base station comprises a transceiver configured to communicate signals with a base station, and a controller configured to configure a control message including an activation/deactivation Control Element (CE), the activation/deactivation CE corresponding to activation/deactivation of at least one secondary carrier, to transmit to the UE the control message in a first subframe, to receive, when the activation/deactivation CE indicates activation of the at least one secondary carrier, a Channel State Information (CSI) report on the at least one secondary carrier in a second subframe, and to receive, when the activation/deactivation CE indicates deactivation of the at least one secondary carrier, a CSI report for the at least one carrier no later than the second subframe.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a secondary carrier activation/deactivation method and apparatus of a UE in a mobile communication system supporting carrier aggregation.

Figure 1:
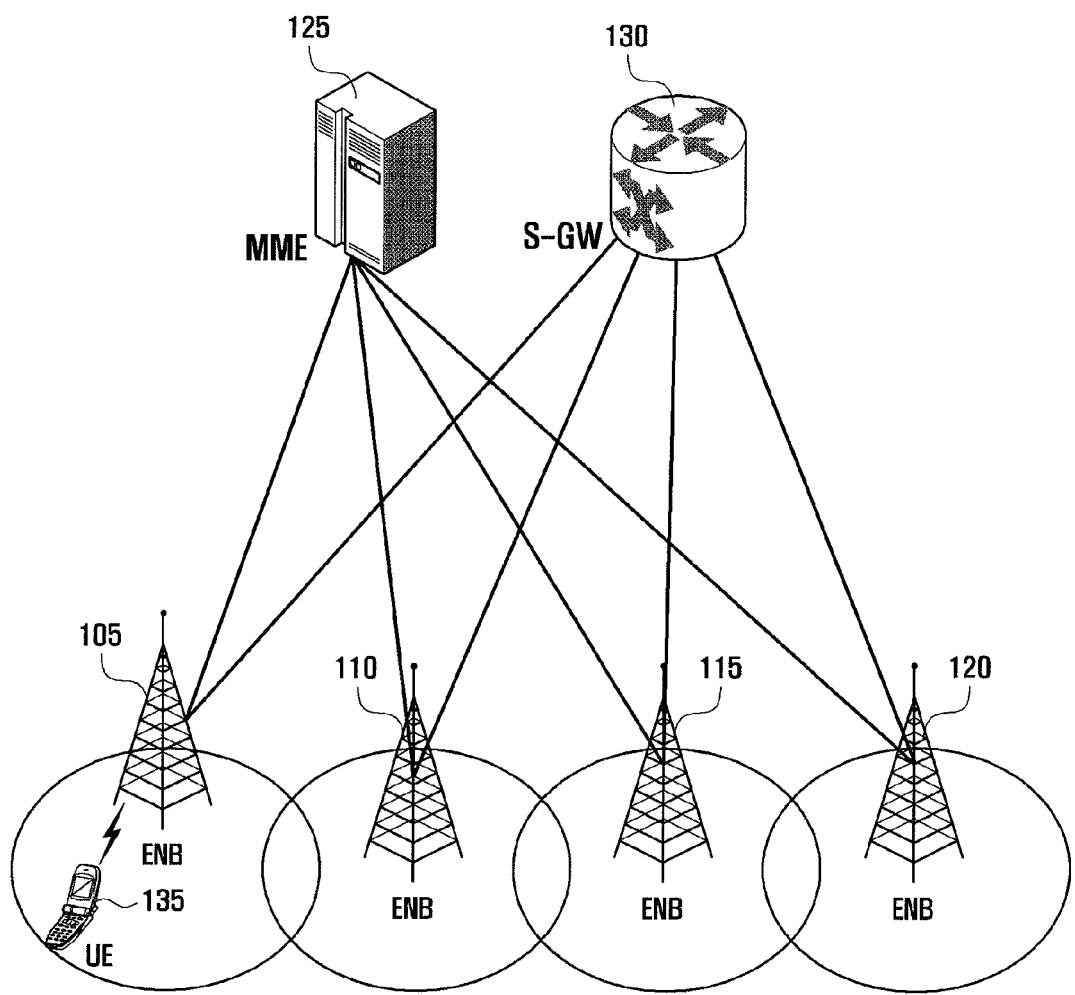
FIG. 1 is a diagram illustrating the architecture of a mobile communication system according to an exemplary embodiment of the present invention.

FIG. 1 is a diagram illustrating the architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE establish a radio link and are responsible for more complicated functions than a legacy node B. In the LTE system, all the user traffic including real time services such as Voice over Internet Protocol (VoIP) are provided through a shared channel. Accordingly, there is a need of a device which is located in the eNB to schedule data based on the state information such as UE buffer conditions, power headroom state, and channel state. Typically, one eNB controls a plurality of cells. In order to secure a data rate of up to 100 Mbps, the LTE system adopts Orthogonal Frequency Division Multiplexing (OFDM) as a radio access technology on 20 MHz bandwidth. The LTE system also adopts Adaptive Modulation and Coding (AMC) to determine the modulation scheme and channel coding rate in adaptation to the channel condition of the UE. S-GW 130 is an entity to provide data bearers so as to establish and release data bearers under the control of the MME 125. MME 125 is responsible for various control functions and connected to a plurality of eNBs 105, 110, 115, and 120.

Figure 2:
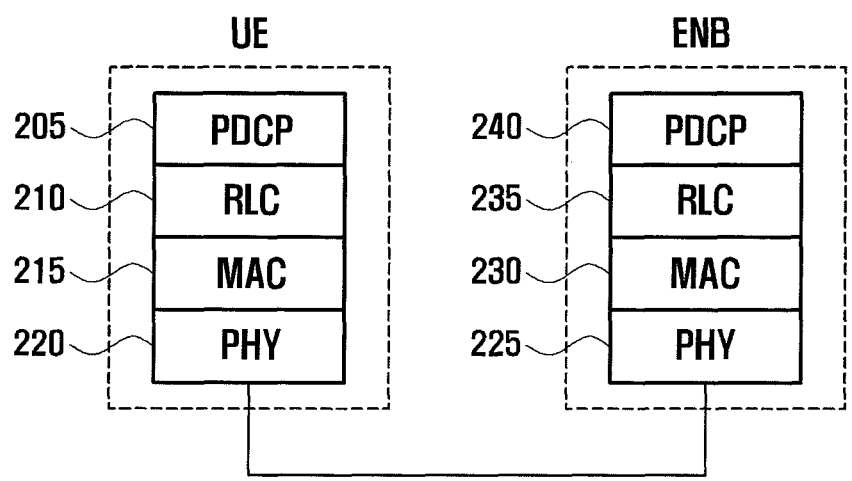
FIG. 2 is a diagram illustrating a protocol stack of the mobile communication system according to an exemplary embodiment of the present invention.

FIG. 2 is a diagram illustrating a protocol stack of the mobile communication system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression. The RLC 210 and 235 is responsible for segmenting the PDCP Protocol Data Unit (PDU) into segments in a size appropriate for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
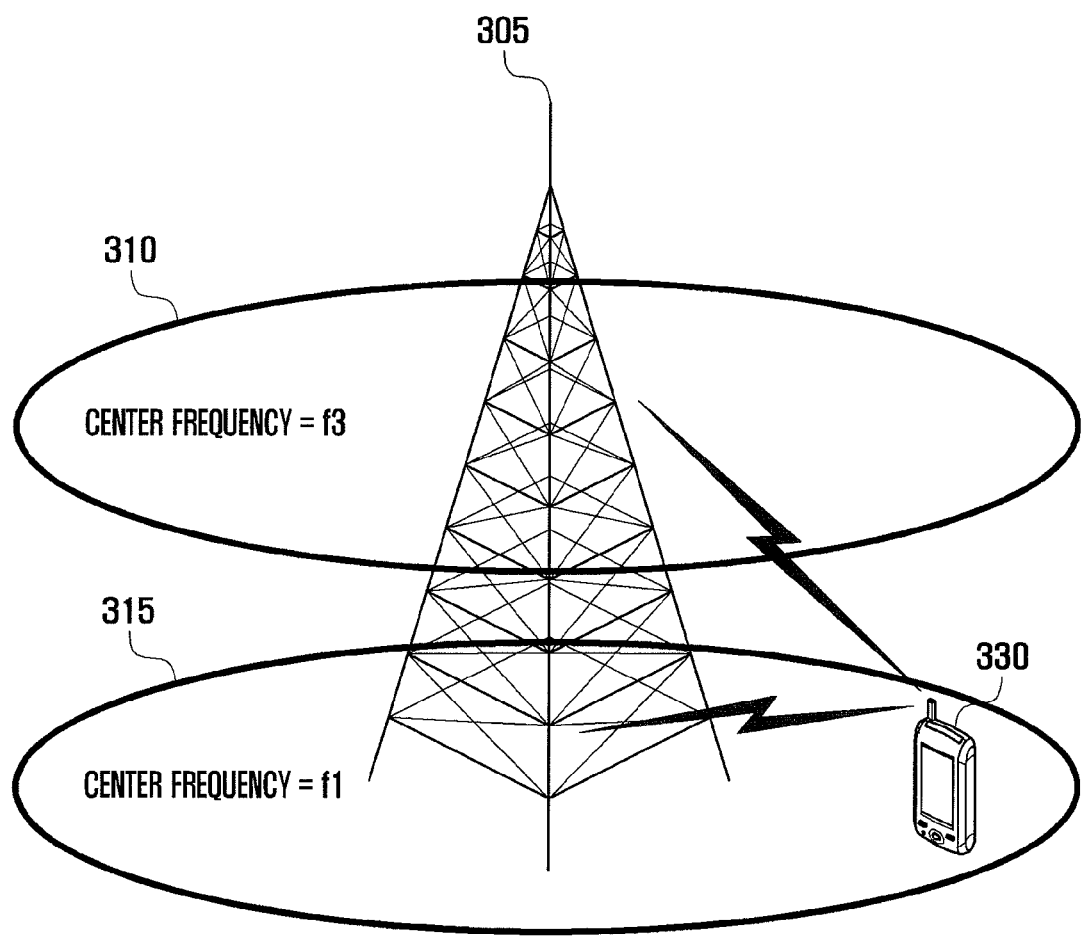
FIG. 3 is a diagram illustrating an exemplary situation of carrier aggregation in the mobile communication system according to an exemplary embodiment of the present invention.

FIG. 3 is a diagram illustrating an exemplary situation of carrier aggregation in the mobile communication system according to an exemplary embodiment of the present invention.

Referring to FIG. 3, an eNB typically uses multiple carriers transmitted and received in different frequency bands. For example, the eNB 305 may be configured to use the carrier 315 with center frequency f1 and the carrier 310 with center frequency f3. If carrier aggregation is not supported, the UE 330 has to transmit/receive data using only one of the carriers 310 and 315. However, the UE 330 having the carrier aggregation capability may transmit/receive data using both the carriers 310 and 315. The eNB may increase the amount of resources to be allocated to the UE having the carrier aggregation capability in adaptation to the channel condition of the UE so as to improve the data rate of the UE.

When a cell is configured with one downlink carrier and one uplink carrier, the carrier aggregation may be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" denotes transmitting or receiving data through control and data channels provided in a cell corresponding to center frequencies and frequency bands of the downlink and uplink carriers. Although an LTE mobile communication system is described for convenience of explanation, exemplary embodiments of the present invention may be applied to other types of wireless communication systems supporting carrier aggregation.

Exemplary embodiments of the present invention propose UE procedure in receipt of SCell activation/deactivation command from the eNB. The UE starts some operations after a predetermined time elapses from the receipt of an activation command, ends some operations before a predetermined time from the receipt of a deactivation command, and ends some other operations after a predetermined time elapses from the receipt of the deactivation command. The time point for executing or ending a certain operation may differ from the time point for executing or ending another operation, because the activation and deactivation delay increases when the time points are determined in order of start or end processing delay of the operations. The UE should not start data transmission/reception in a SCell immediately upon receipt of the command from the eNB. This is because it takes additional time to activate the function blocks for communication in the SCell. Although the function blocks are activated, there may be some delay before the function blocks operate normally.

Figure 4:
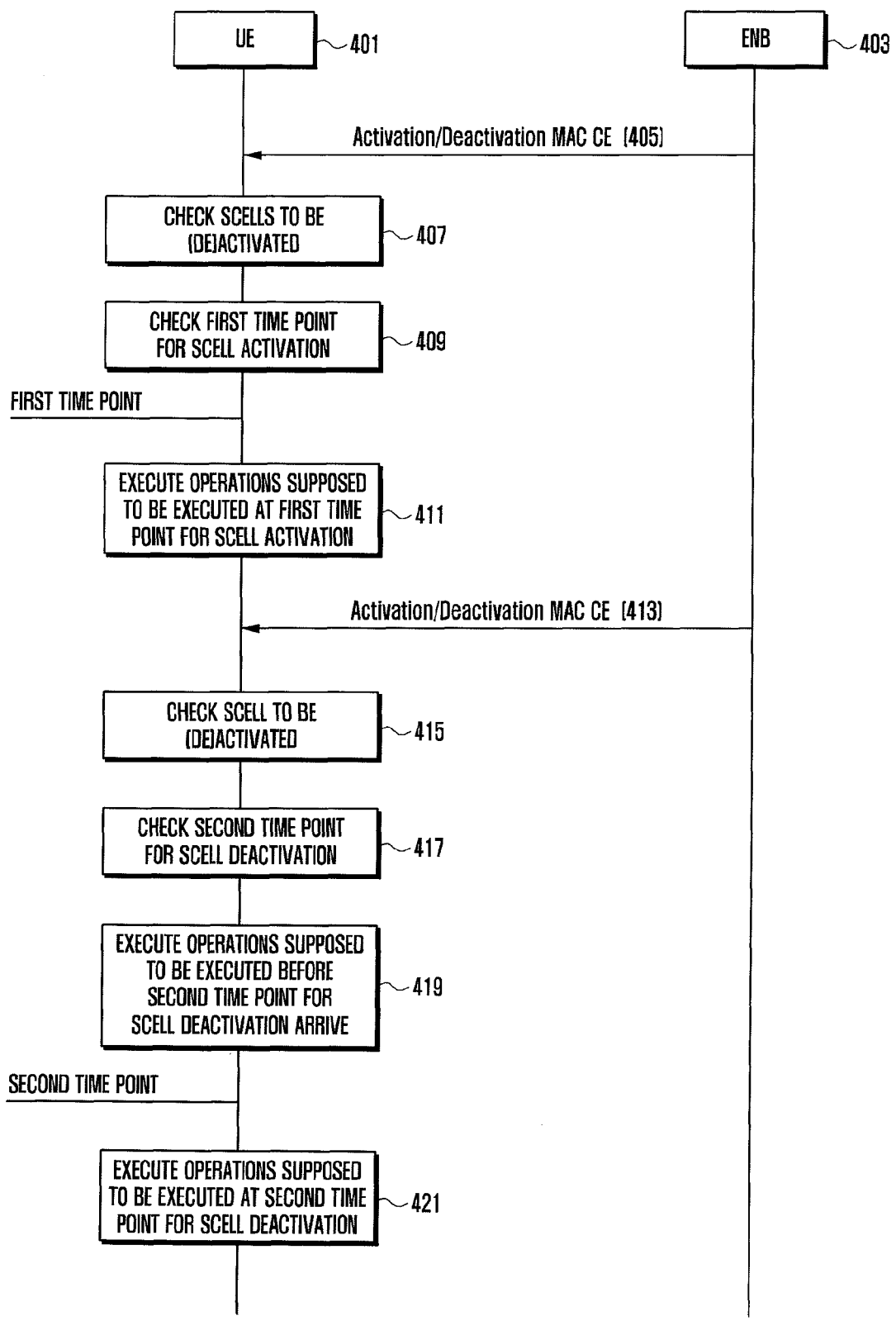
FIG. 4 is a signaling diagram illustrating message flows between a User Equipment (UE) and an evolved Node B (eNB) for a secondary carry activation/deactivation method according to an exemplary embodiment of the present invention.

FIG. 4 is a signaling diagram illustrating message flows between UE and eNB for secondary carry activation/deactivation method according to an exemplary embodiment of the present invention.

Referring to FIG. 4, the eNB 403 sends the UE 401 a secondary carrier control message (hereinafter, Activation/Deactivation MAC Control Element (CE) is used interchangeably with secondary carrier control message) including information on the SCell cells to be activated/deactivated among the configured SCells in $N^{th}$ subframe in step 405. The Activation/Deactivation MAC CE is a MAC CE fixed in size of 8 bits and includes seven C fields and one R field. R field denotes a reserved field. The C fields are referred to as C7, C6, C5, C4, C3, C2, and C1 (i.e. Ci). Each C field is set to 1 for activation and 0 for deactivation of SCell i, i.e. secondary carrier. i is an integer selected in the range between 1 and 7 as the secondary carrier identifier and transmitted by the eNB to the UE along with the secondary carrier when new secondary carriers are configured.

Upon receipt of the Activation/Deactivation MAC CE, the UE identifies the SCell(s) to be activated/deactivated in step 407 and, if a certain cell is to be activated, identifies a first time point in step 409. The first time point indicates an $(N+m)^{th}$ subframe, where m is an integer greater than 1 (e.g. 8). The first time point is for executing operations to be performed before other operations. m is determined in consideration of the time taken to decode the received Activation/Deactivation MAC CE and analyzes the meaning of the decoded Activation/Deactivation MAC CE and may have a value large enough for terminals having relatively low processing capability. At the first time point, i.e. $(N+m)^{th}$ subframe, the UE performs the first operations to be executed at the first time point in step 411. These operations may include:

Start Channel State Information (CSI) report: the CSI report includes CQI/PMI/RI/PTI necessary for eNB's link adaptation and scheduling.

CQI (Channel Quality Indicator): transmission format recommended to fulfill a bit error rate of 10%.

PMI (Precoding Matrix Index): Index for use in closed-loop spatial multiplexing.

RI (Rank Indicator): recommended Transmission Rank

PTI (Precoder Type Indicator): recommended precoder type

Start monitoring PDCCH (Physical Downlink Control Channel in SCell

Start transmission of SRS (Sounding Reference Symbol) (only when sounding reference signal is configured)

The eNB sends the UE an Activation/Deactivation MAC CE indicating the SCells to be activated/deactivated among the SCells configured for the UE in $P^{th}$ subframe in step 413.

Upon receipt of the Activation/Deactivation MAC CE, the UE identifies the SCell(s) to be activated/deactivated in step 415 and, if a certain cell is to be activated, identifies a second time point in step 417. The second time point indicates a $(P+o)^{th}$ subframe, where o is an integer greater than 1 (e.g. 8). The second time point may be equal to the first time point. The UE performs the second operations before the second time point, i.e. $(P+o)^{th}$ subframe in step 419. Since these operations are not associated with the interaction between the UE and eNB, it is not necessary for the UE to stop the operations at a predetermined time point. The operations include:

Stop monitoring PHCCH (Physical Downlink Control Channel) in SCell

Stop transmitting SRS (Sounding Reference Symbol)

The UE executes third operations to be performed at the second time point, i.e. $(P+o)^{th}$ subframe, in step 421. These operations include stopping a reporting of CSI. Since this operation is associated with the interaction between the UE and eNB, the UE should stop the operations at a predetermined time point to avoid performance degradation of the eNB caused by not stopping the corresponding operations. For example, if the eNB is not aware that the UE has stopped reporting channel state information, the eNB may fail scheduling due to the misjudgment on the UE's channel state.

All of the operations may be performed by following the above described procedure.

Figure 5:
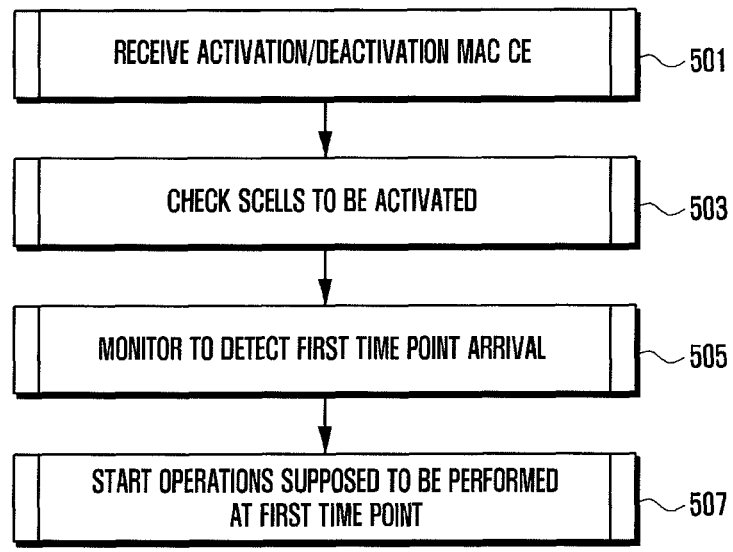
FIG. 5 is a flowchart illustrating a UE procedure for performing first operations in a secondary carrier activation/deactivation method according to an exemplary embodiment of the present invention.

FIG. 5 is a flowchart illustrating UE procedure for performing first operations in a secondary carrier activation/deactivation method according to an exemplary embodiment of the present invention.

Referring to FIG. 5, the UE receives Activation/Deactivation MAC CE having an 8-bit bitmap in $N^{th}$ subframe in step 501. Each bit of the bitmap of MAC CE indicates whether to activate or deactivate the corresponding SCell.

Upon receipt of the Activation/Deactivation MAC CE, the UE determines whether there is any SCell to be newly activated and, if so, identifies the SCell to be activated in step 503. The UE identifies the deactivated SCells before the receipt of a MAC CE and, when the MAC CE is received, searches the bitmap of the MAC CE for bits representing the deactivated SCells but marked for activation.

If there is any SCell to be activated, the UE determines the first time point and performs the first operations when the first time point arrives in step 505. As described with reference to FIG. 4, the first time point may correspond to an $(N+m)^{th}$ subframe after the time duration of m subframes elapses from the $N^{th}$ subframe in which the UE receives the Activation/Deactivation MAC CE. The UE executes the operations to be performed at the first time point in step 507, i.e. in the $(N+n)^{th}$ subframe. As described with reference to FIG. 4, these operations include:

Start channel State Information (CSI) report
Start monitoring PDCCH (Physical Downlink Control Channel) in SCell
Start transmission of SRS (Sounding Reference Symbol) (only when sounding reference signal is configured)

The value of m is known to both the UE and eNB (e.g. m=8).

Figure 6:
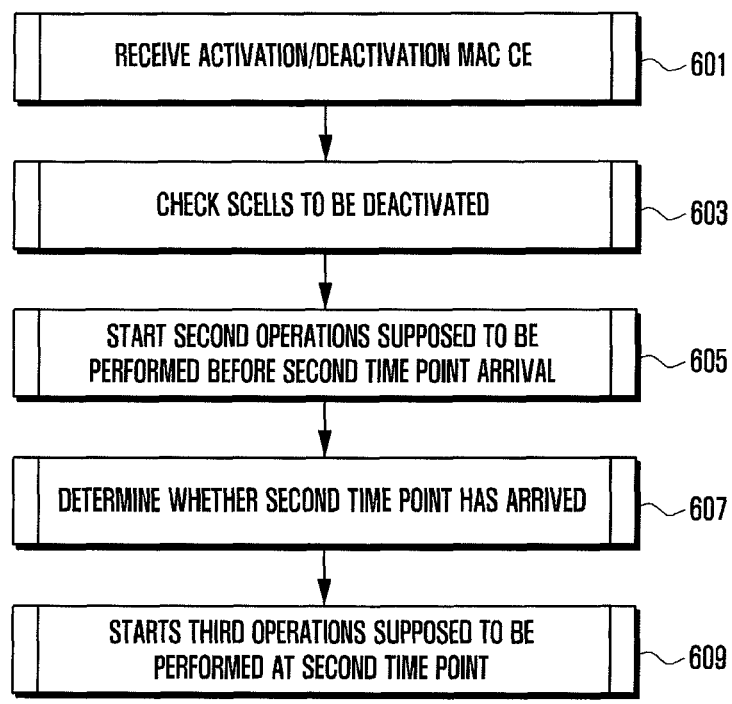
FIG. 6 is a flowchart illustrating a UE procedure for performing second operations in a secondary carrier activation/deactivation method according to an exemplary embodiment of the present invention.

FIG. 6 is a flowchart illustrating a UE procedure for performing second operations in a secondary carrier activation/deactivation method according to an exemplary embodiment of the present invention.

Referring to FIG. 6, the UE receives the Activation/Deactivation MAC CE including 8-bit bitmap in the $N^{th}$ subframe in step 601. Each bit of the bitmap of MAC CE indicates whether to activate or deactivate the corresponding SCell.

Upon receipt of the Activation/Deactivation MAC CE, the UE determines whether there is any SCell to be deactivated and, if so, identifies the SCell to be deactivated in step 603. The UE identifies the activated SCells before the receipt of a MAC CE and, when the MAC CE is received, searches the bitmap of the MAC CE for bits representing the activated SCells but marked for activation.

If there is any SCell to be deactivated, the UE identifies the second time point and executes the second operations supposed to be performed before the second time point arrives in step 605. As described with reference to FIG. 4, the second operations include:
Stop monitoring PHCCH (Physical Downlink Control Channel) in SCell
Stop transmitting SRS (Sounding Reference Symbol)

The UE waits for the arrival of the second time point in step 607. As described with reference to FIG. 4, the first time point corresponds to the $(P+o)^{th}$ subframe after the time duration of o subframes elapses from $P^{th}$ subframe in which the UE receives the Activation/Deactivation MAC CE. The UE executes the third operations supposed to be performed at the second time point in step 609, i.e. in the $(P+o)^{th}$ subframe As described with reference to FIG. 4, the third operations include stopping the reporting of CSI. The value of o is known to both the UE and eNB (e.g. o=8).

Figure 7:
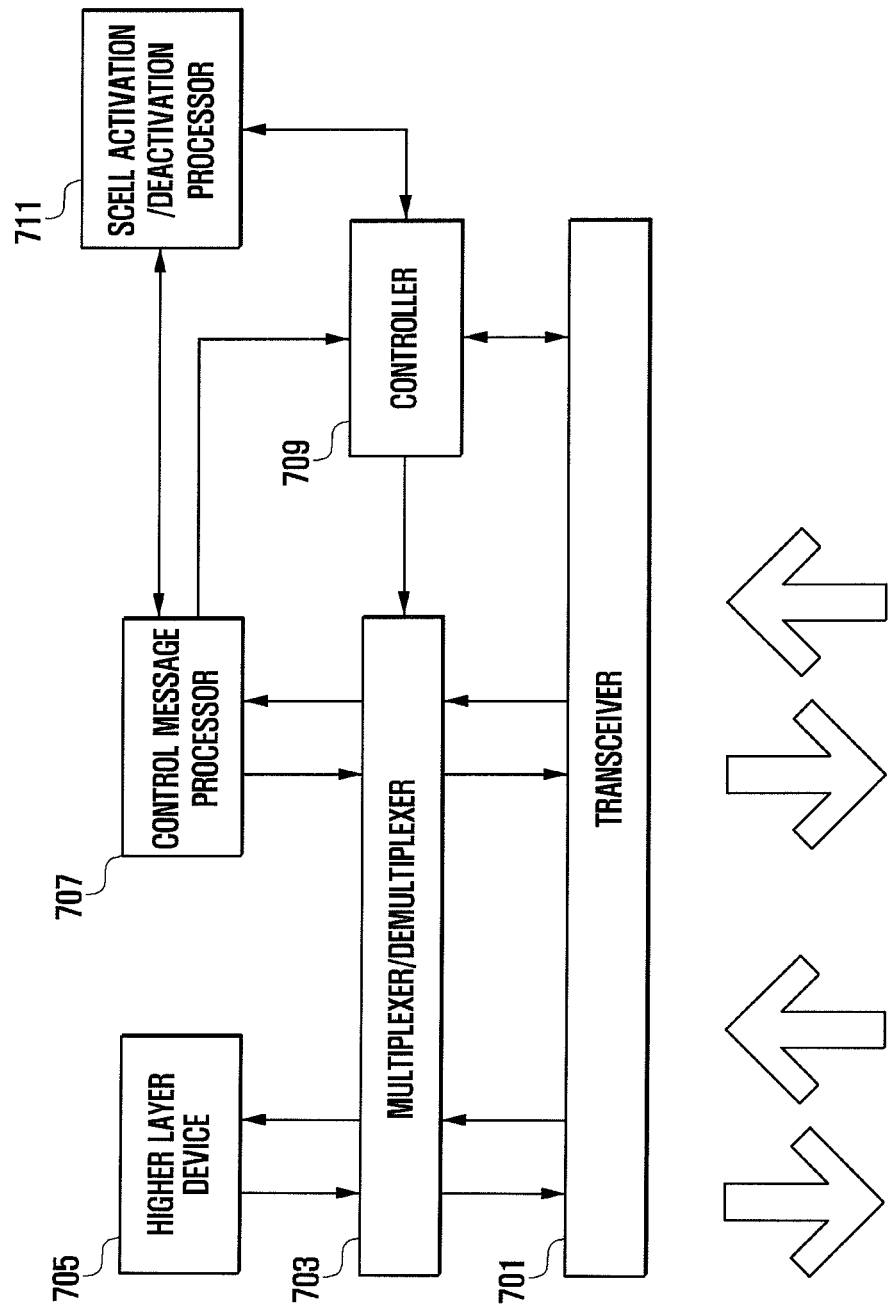
FIG. 7 is a block diagram illustrating a configuration of a UE according to an exemplary embodiment of the present invention.

FIG. 7 is a block diagram illustrating a configuration of a UE according to an exemplary embodiment of the present invention.

Referring to FIG. 7, the UE includes a higher layer device 750 for generating data to be transmitted and processing the received data, a control message processor 707 for processing control messages received and to be transmitted, a multiplexer/demultiplexer 703 for multiplexing data and control signals to be transmitted via the transceiver 701 and for demultiplexing the received data and controls signals to be delivered to the control message controller 707 and the higher layer device 705 respectively under the control of the control unit 709.

According an exemplary embodiment of the present invention, when the Activation/Deactivation MAC CE for activation is received, the control message processor 707 notifies the SCell activation/deactivation processor 711 of the receipt of MAC CE such that the SCell activation/deactivation processor 711 determines the first time point and, when the first time point arrives, notifies the controller 709 and the control message processor 707 of the operations to be executed at the first time point. When the Activation/Deactivation MAC CE for deactivation is received, the control message processor 707 notifies the SCell activation/deactivation processor 711 of the receipt of the MAC CE such that the SCell activation/deactivation processor 711 determines the second time point and notifies the controller 709 and the control message processor 707 of the operations to be executed before and when the second time point arrives.

Although the description is directed to the UE composed of a plurality of function blocks performing different functions, exemplary embodiments of the present invention is not limited thereto. For example, the UE may be implemented with a transceiver and an integrated controller. In this case, when a secondary carrier control message is received from the eNB, the controller checks the secondary carriers to be activated/deactivated. The controller may monitor the arrival of the first time point and control to perform the first operations when the first time point arrives.

The first time point is the time after the time duration corresponding to 8 subframes elapses from the receipt of the secondary carrier control message. The first operations may include at least one of CSI report initiation, PDCCH monitoring initiation on secondary carrier, and SRS transmission initiation.

The controller may also control to perform the second operations before the second time point arrives and the third operations at the second time point when a secondary carrier deactivation command is analyzed.

According to an exemplary embodiment of the present invention, the second time point may be equal to the first time point, i.e. the time after the time duration corresponding to 8 subframes elapses from the receipt of the secondary carrier control message. The second operations may include at least one of PDCCH monitoring termination on the secondary carrier and SRS transmission termination.

As described above, the secondary carrier activation/deactivation method and apparatus according to exemplary embodiments of the present invention controls specific operations to be executed at predetermined time points in association with the activation and deactivation of SCells in the mobile communication supporting carrier aggregation, thereby preventing a UE from malfunctioning.

The secondary carrier activation/deactivation method and apparatus according to exemplary embodiments of the present invention is also capable of guaranteeing the successful execution of operations necessary in activation and deactivation of SCells, resulting in completion of activation and deactivation without error.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for activating/deactivating secondary carriers of a user equipment (UE) in a mobile communication system supporting carrier aggregation, the method comprising:
receiving control information including an activation command or a deactivation command of at least one secondary carrier in a first sub-frame from a base station;
performing at least one first operation for the at least one secondary carrier in a second sub-frame; and
performing, when the control information includes the deactivation command of the at least one secondary carrier, at least one second operation for the at least one secondary carrier no later than the second sub-frame.

2. The method of claim 1, a difference of sub-frame between the first sub-frame and the second sub-frame is 8.

3. The method of claim 1, wherein the at least one first operation comprises at least one of channel state information report, physical downlink control channel monitoring on the at least one secondary carrier, and sounding reference signal transmission when the control information includes the activation command of the at least one secondary carrier.

4. The method of claim 3, wherein the at least one channel state information report comprises at least one of a channel quality indicator, a precoding matrix index, a rank indicator, and a precoder type indicator.

5. The method of claim 1, wherein the at least one second operation comprises at least one of a termination of physical downlink control channel monitoring and a termination of sounding reference signal transmission of the at least one secondary carrier.

6. The method of claim 1, wherein the at least one first operation comprises a termination of channel state information report when the control information includes the deactivation command of the at least one secondary carrier.

7. A user equipment (UE) for controlling activation/deactivation of secondary carriers in a mobile communication system supporting carrier aggregation, the UE comprising:
 a transceiver for transmitting and receiving signals with a base station; and
 a controller configured to receive control information including an activation command or a deactivation command of at least one secondary carrier in a first sub-frame from a base station, to perform at least one first operation for the at least one secondary carrier in a second sub-frame, and to perform, when the control information includes the deactivation command of the at least one secondary carrier, at least one second operation for the at least one secondary carrier no later than the second sub-frame.

8. The UE of claim 7, wherein a difference of sub-frame between the first sub-frame and the second sub-frame is 8.

9. The UE of claim 7, wherein the at least one first operation comprises at least one of channel state information report, physical downlink control channel monitoring on the at least one secondary carrier, and sounding reference signal transmission when the control information includes the activation command of the at least one secondary carrier.

10. The UE of claim 9, wherein the at least one channel state information report comprises at least one of a channel quality indicator, a precoding matrix index, a rank indicator, and a precoder type indicator.

11. The UE of claim 7, wherein at least one second operation comprises at least one of a termination of physical downlink control channel monitoring and a termination of sounding reference signal transmission of the at least one secondary carrier.

12. The UE of claim 7, wherein the at least one first operation comprises a termination of channel state information report when the control information includes the deactivation command of the at least one secondary carrier.

13. A base station for controlling activation/deactivation of secondary carriers in a mobile communication system supporting carrier aggregation, the base station comprising:
 a transceiver for transmitting and receiving signals with a user equipment (UE); and
 a controller configured to generate control information including an activation command or a deactivation command of at least one secondary carrier, to transmit the control information in a first subframe to the UE, to receive, when the control information includes the activation command of the at least one secondary carrier, a channel state information (CSI) report on the at least one secondary carrier in a second subframe, and to terminate, when the control information includes the deactivation command of the at least one secondary carrier, a reception of sound reference signal for the at least one carrier no later than the second subframe.

14. The base station of claim 13, wherein a difference of sub-frame between the first sub-frame and the second sub-frame is 8.

15. The base station of claim 13, wherein the CSI report comprises at least one of a channel quality indicator, a precoding matrix index, a rank indicator, and a precoder type indicator.

* * * * *